US008972466B1

(12) United States Patent
Kumar

(10) Patent No.: US 8,972,466 B1
(45) Date of Patent: Mar. 3, 2015

(54) EFFICIENT REVERSE NAME LOOKUP IN A FILE SYSTEM

(75) Inventor: Sanjay Kumar, Pune (IN)

(73) Assignee: Symantec Corporation, Mountain View, CA (US)

( * ) Notice: Subject to any disclaimer, the term of this patent is extended or adjusted under 35 U.S.C. 154(b) by 139 days.

(21) Appl. No.: 13/326,683

(22) Filed: Dec. 15, 2011

(51) Int. Cl.
*G06F 17/30* (2006.01)
(52) U.S. Cl.
USPC .......................................................... 707/823
(58) Field of Classification Search
CPC ................................................. G06F 17/30091
USPC .......................................................... 707/823
See application file for complete search history.

(56) References Cited

U.S. PATENT DOCUMENTS

| 7,752,226 | B1 * | 7/2010 | Harmer et al. | 707/796 |
| 2007/0094315 | A1 * | 4/2007 | Seo et al. | 707/205 |
| 2008/0046445 | A1 * | 2/2008 | Passey et al. | 707/100 |

OTHER PUBLICATIONS

D. Poirier, The Second Extended File System: Internal Layout, (Oct. 3, 2009) [retrieved on Jan. 3, 2013], pp. 1-42. Retrieved from the Internet: http://web.archive.org/web/20091003042541/http://www.nongnu.org/ext2-doc/ext2.html.*

* cited by examiner

*Primary Examiner* — Jacob F Bétit
*Assistant Examiner* — Kristopher Andersen
(74) *Attorney, Agent, or Firm* — Lowenstein Sandler LLP

(57) ABSTRACT

A method and apparatus for performing a reverse name lookup in a file system is described. A file system driver executing on the computing system agent may receive a reverse name lookup request for an inode number. The file system driver retrieves a disk inode, corresponding to the inode number, a first block number of a first directory entry (dentry), the first dentry identifying directory data blocks where the inode number and a file name are stored. The file system driver searches the first dentry for the inode number to find the corresponding file name, and retrieves the file name from the first dentry.

20 Claims, 5 Drawing Sheets

EFFICIENT REVERSE NAME LOOKUP IN A FILE SYSTEM

TECHNICAL FIELD

Embodiments of the invention relate to the field of processing data, and more particularly, to efficient reverse name lookup in a file system.

BACKGROUND OF THE INVENTION

A modern organization typically maintains a data storage system to store and deliver sensitive information concerning various significant business aspects of the organization. Sensitive information may include data on customers (or patients), contracts, deliveries, supplies, employees, manufacturing, or the like. In addition, sensitive information may include intellectual property (IP) of an organization such as software code developed by employees of the organization, documents describing inventions conceived by employees of the organization, etc.

Organizations invest significant efforts in installing DLP components, especially on important machines where confidential data is getting generated, but they may not be able to protect each computer in the enterprise, due to reasons like large number of different platforms or operating systems (OS), machine outages, quick and dynamic provisioning of virtual machines, no clear and individual accounting for test and lab machines. DLP technologies apply configurable rules to identify objects, such as files, that contain sensitive data and should not be found outside of a particular enterprise or specific set of host computers or storage devices. Even when these technologies are deployed, it is possible for sensitive objects to 'leak'. Occasionally, leakage is deliberate and malicious, but often it is accidental too. For example, in today's global marketplace environment, a user of a computing system transmits data, knowingly or unknowingly, to a growing number of entities outside a computer network of an organization or enterprise. Previously, the number of entities were very limited, and within a very safe environment. For example, each person in an enterprise would just have a single desktop computer, and a limited number of software applications installed on the computer with predictable behavior. More recently, communications between entities may be complex and difficult for a human to monitor.

Some applications for data loss protection may include a reverse name lookup support in a file system. For example, a given inode number (ino), the reverse name lookup may return a complete path of a file. An inode is a data structure on a file system that stores information, also sometimes referred to as metadata, about a file, a directory, or a file system object. The inode however typically does not contain the actual data or the name of the file. For example, each file is associated with an inode, which may be identified by an integer number, referred to as i-number, inode number, or ino. The inodes may store information about files and folders, such as file ownership, access mode permissions, and file types. Generally, the inode number indexes a table of inodes in a known location on a device, and from the inode number, the file system driver portion of the kernel can access the contents of the inode, including the location of the file allowing access to the file. As described above, the inodes usually do not contain file names, only file metadata. Thus, a file system driver should search a directory looking for a particular file name and then convert the file name to the correct corresponding inode. The reverse is true as well.

Conventional ways of calculating complete path from an inode number (ino) typically result in many disk accesses. One conventional method could start from a root and do recursive searching of the inode number in the directory entries (dentry) of all the directories and sub-directories and keep appending the directory (dir) name in the resultant path, and removing its name if not found in that directory. This results in a reverse lookup using a forward lookup, which leads to a very large number of disk accesses. Some of the file system, like the Veritas File system (VxFS) improves it by storing parent directory's inode number on this disk inode to reduce disk access of searching parent directory, removing the necessity to do a forward lookup for the reverse lookup operation. But again a large number of disk accesses is usually used to search a dentry with an inode number in all the data blocks of the directory. The following example provides some mathematics to illustrate the number of disk accesses using the conventional method. This example considers an average size of dentry as 32 bytes, keeping 16 bytes as an average size of file name. Block size is 4K=4096 bytes. Hence, a block can hold up to 27=128 dentries. Now, if a directory contains 10 million files, then the number of data blocks required for the directory would be approximately 100,000 or 100K. In a worst case, to search an inode number in the directory would require 100,000+1+1 disks access. And the best case would be 1+1+1=3 where the inode number found in the very first data block of the directory, which has very low probability. Disks accesses increase drastically if there are multiple such directories where millions of files are stored. Searching of inode number in dentries in all the data blocks of the directory may be a bottle neck for reverse name lookup. Also, if there is a case of reverse name lookup of an inode number which has many hard links. A hard link is a directory entry that associates a name with a file on a file system. By contrast, a soft link on such file systems is not a link to a file itself, but to a file name. Currently, conventional solutions typically give only the path name of first hard link. Also, conventional solutions usually allow the path name of all the hard links to be looked-up from a given inode number, but still utilize a very lengthy method for calculating the path name such as described above.

SUMMARY OF THE INVENTION

A method and apparatus for performing a reverse name lookup in a file system is described. The method and apparatus may be used in DLP products. In one exemplary embodiment of a method, a file system driver executing on the computing system agent receives a reverse name lookup request for an inode number. The file system driver retrieves from a disk inode, corresponding to the inode number, a first block number of a first directory entry (dentry), the first dentry identifying directory data blocks where the inode number and a file name are stored. The file system driver searches the first dentry for the inode number to find the corresponding file name, and retrieves the file name from the first dentry. In a further embodiment, the file system driver determines whether the first dentry identifies a second dentry of a first parent directory. When the first dentry identifies the second dentry, the file system driver retrieves a first parent inode number of the first parent directory to make a link list and a second block number of parent directory data blocks where a first name of a first hard link of the first parent directory is stored. The file system driver searches the second dentry for the second block number to find the first name of the first hard link. The file system driver retrieves the first name from the second dentry, and pre-appends the first name of the first hard link to a path of the file name.

In another embodiment of the method, the file system driver determines whether the second dentry identifies a third dentry of a third parent directory. When the second dentry identifies the third dentry, the file system driver retrieves from the third dentry, a second parent inode number of the second parent directory to add to the link list, and a third block number of parent directory data blocks where a second name of a second hard link of the second parent directory is stored. The file system driver searches the third dentry for the third block number to find the second name of the second hard link. The file system driver retrieves the second name from the third dentry, and pre-appends the second name of the second hard link to the path of the file name.

In another embodiment, the disk inode includes a first structure having the inode number, the block number of the first dentry, and a hard link count, and the first dentry includes a second structure having the inode number, the file name, a file length, and a dentry length. In one embodiment, the second structure is variable.

In another embodiment, the file system driver determines whether the link count in the disk node is more than one. When the link count is equal to or more than one, the file system driver retrieves a parent inode number of a first parent directory from the first dentry to make a link list. When the link count is equal to or more than one, the file system driver retrieves a second block number of the first parent directory where a first name of a first hard link of the first parent directory is stored. When the link count is less than one, the file system driver returns the file name in response to the request.

In yet another embodiment, the file system driver searches a second dentry of the first parent directory for the second block number to find the first name of the first hard link, and retrieves the first name of the first hard link from the second dentry, and pre-appends the first name of the first hard link to a path of the file name. In yet a further embodiment, the file system driver determines whether a second link count of the parent directory is more than one. When the second link count is equal to or more than one, the file system driver retrieves a second parent inode number of a second parent directory from the second dentry to add to the link list. When the second link count is equal to or more than one, the file system driver retrieves a third block number of the second parent directory where a second name of a second hard link of the second parent directory is stored. When the second link count is less than one, the file system driver returns the path of the file name in response to the request. In yet a further embodiment, the file system driver searches a third dentry of the second parent directory for the third block number to find the second name of the second hard link. The file system driver retrieves the second name of the second hard link from the third dentry, and pre-appends the second name of the second hard link to the path of the file name.

In another embodiment, when the link count in the disk mode is more than one then a first eight bytes of the file name stores a next parent inode number of a next parent directory and a next block number of the next parent directory. In one embodiment, the dentry length is adjusted accordingly when the link count in the disk mode is more than one.

In another embodiment, the first parent directory is a partitioned directory and the parent inode number is stored in the disk inode.

In addition, a computer readable storage medium performing a reverse name lookup in a file system is described. An exemplary computer readable storage medium provides instructions, which when executed on a processing system causes the processing system to perform a method such as the exemplary methods discussed above.

Further, systems and apparatus performing a reverse name lookup in a file system are described. An exemplary apparatus may include a memory and a processor coupled to the memory. The processor is configured to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
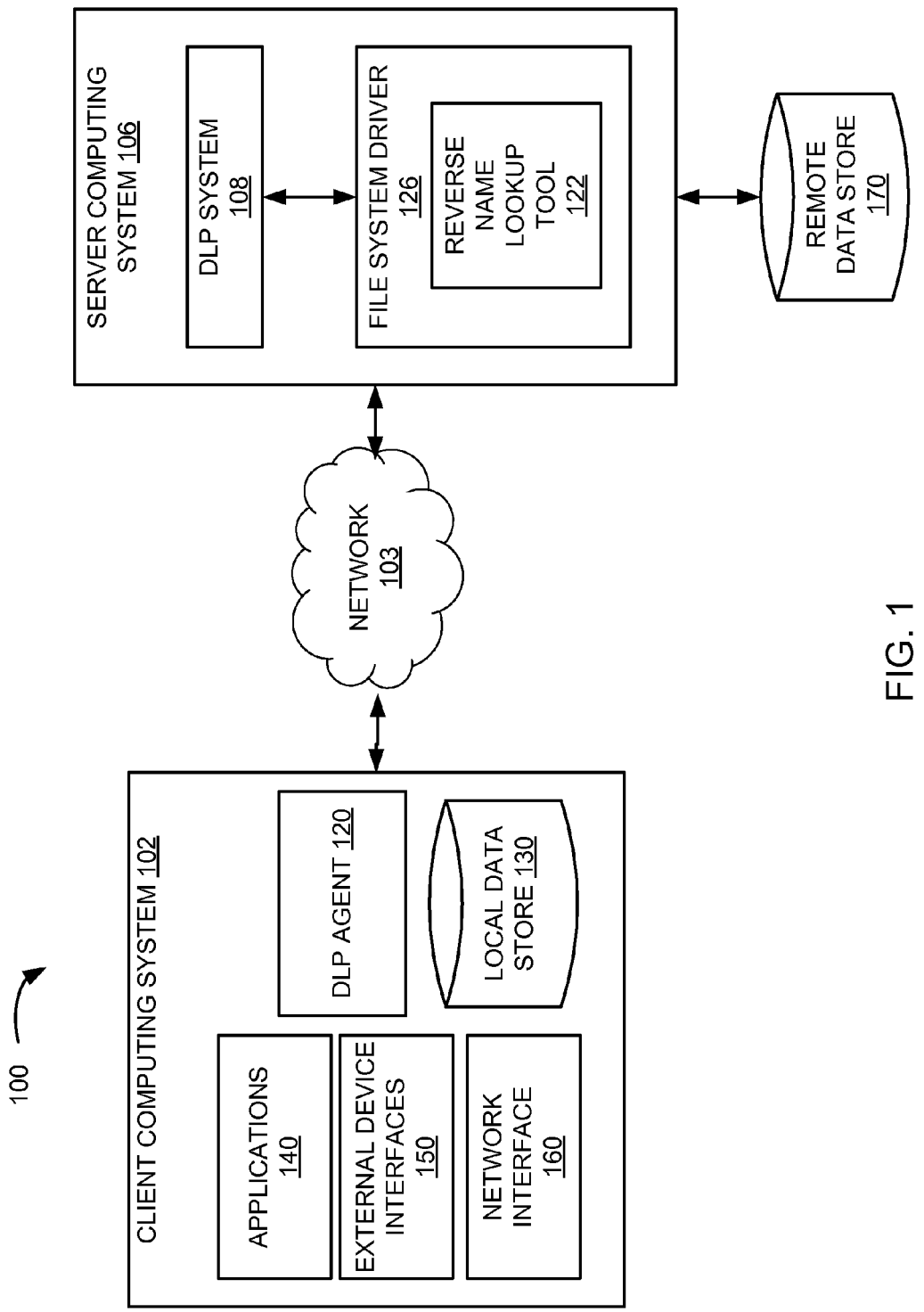
FIG. 1 is a block diagram of exemplary network architecture in which embodiments of a reverse name lookup tool may operate.

A method and apparatus for performing a reverse name lookup in a file system is described. The method and apparatus may be used in DLP products. In one exemplary embodiment of a method, a file system driver executing on the computing system agent receives a reverse name lookup request for an inode number. The file system driver retrieves from a disk inode, corresponding to the inode number, a first block number of a first directory entry (dentry), the first dentry identifying directory data blocks where the inode number and a file name are stored. The file system driver searches the first dentry for the inode number to find the corresponding file name, and retrieves the file name from the first dentry.

The embodiments described herein may be used as an efficient method of finding complete path file names of a file for a given inode number, commonly referred to a reverse name lookup in a file system, considering all hard links as well. As described above, conventional solutions utilize a very length method for calculating the path name. The embodiments described herein store the file name to disk inode structure and if space is not large enough to fit the file name, then it stores the block number of the directory data blocks where the inode number with the file name is stored as a dentry. This may restrict searching of the dentry to a single block if the file name is not already stored in the disk inode. In one embodiment, the operations would include the following:

1. Call iget( ) for a given inode number (ino), which brings the disk inode structure into memory. If the block is already in the memory, then no disk access for the disk inode.

2. Get the file name from disk inode, if stored otherwise go to step#3 with block number of the dentry.
3. Read the disk block, if the block is not already in the memory and then search for this inode number and get the file name from the dentry. If not found (call it a miss), then search it in other data blocks of the parent directory inode and update the disk inode with new block.

Repeat the steps 1-3 for parent directory whose inode number stored in the disk inode and pre-append the path into resultant path Finding path of all hard links during reverse name lookup efficiently can be solved by introducing two new fields in the dentry structure if the link count of the inode number is more than one i.e. more than one hard link.

a) inode number of parent directory of the next hard link to make a link list of all the hard links since inode number of all the hard links would be same b) block number of parent directory data blocks where the name of the hard link stored in the dentry.

Here searching of inode number in dentries in all the data blocks of the directory is completely removed, hence reducing the disk access.

The embodiments described herein may be used in the following exemplary cases: 1) Partitioned Directory—update the new dentry block number on disk inode structure during partitioning; and 2) Directory Compaction—update with new block after first miss as mentioned above in step #3.

In other embodiments, a user may need to find a list of files which meet certain criteria, for example, files with a size more than 2 GB, modified age more than one month, or the like. This may be used in the storage tiering at file system level. One method of doing this is to traverse all the directories and run a stat command to shortlist files. In this case, lookup is overhead. Using the embodiments described herein, one efficient way of doing this is traverse the inode table and shortlist the inodes and do reverse name lookup on those shortlisted inodes. Alternatively, the embodiments described herein may be used in other scenarios to reduce the number of disk accesses.

In the following description, numerous details are set forth. It will be apparent, however, to one of ordinary skill in the art having the benefit of this disclosure, that embodiments of the present invention may be practiced without these specific details.

FIG. 1 is a block diagram of an exemplary network architecture 100 in which embodiments of a reverse name lookup tool 122 may operate. The network architecture 100 may include multiple client computing systems 102 (only one illustrated) and a server computing system 106 coupled via a network 103 (e.g., public network such as the Internet or private network such as a local area network (LAN)). The client computing system 102 may include personal computers, laptops, PDAs, mobile phones, network appliances, etc. The server computing system 106 may be a network appliance, a gateway, a personal computer, etc. The client computing systems 102 and the server computing system 106 may reside on the same LAN, or on different LANs that may be coupled together via the Internet, but separated by firewalls, routers, and/or other network devices. In another embodiment, the computing systems may reside on different networks. In the depicted embodiment, the server computing system 106 may host a DLP system 108 and a file system driver 122. The reverse name lookup tool 122 may be part of the file system driver 126. In other embodiments, the server computing system 106 may host one of the DLP system 108 and the file system driver 126 and another server computing system (not illustrated) may host the other one. Alternatively, other configurations are possible as would be appreciated by one of ordinary skill in the art having the benefit of this disclosure. In one embodiment, the client computing systems 102 and server computing systems 106 may be part of an organization, such as a corporate enterprise. Alternatively, the server computing system 106 and the computing systems 102 may be part of different organizations.

The DLP system 108 may communicate with DLP agents 120. Although the embodiments may be used in a DLP system using DLP agents 120, the embodiments may also be used in other DLP products. For example, in one embodiment, the reverse name lookup tool 122 receives a reverse name lookup request from the DLP agent 120 over the network 103. In another embodiment, the reverse name lookup tool 122 receives the request from the DLP system 108. When the DLP system 108 is hosted on another computing system, the reverse name lookup tool 122 receives the request over the network 103. It should also be noted that the reverse name lookup tool 122 can be implemented in other configurations, such as within the DLP system 108. Also, the embodiments described herein may be used in other applications that can be used for performing reverse name lookup operations as would be appreciated by one of ordinary skill in the art having the benefit of this disclosure.

In one embodiment, the DLP agent 120 monitors outbound data transfers by the client computing system 102. As part of monitoring and detecting violations, the DLP agent 120 may need a complete path file name for a given inode. The DLP system 108 may have a list of all the inodes, and the DLP agent 120 may get the list of inodes from the DLP system 108. Alternatively, the DLP agent 120 may retrieve a list of inodes from other sources. The DLP agent 120 sends the reverse name lookup request to the reverse name lookup tool 122 over the network 103 to obtain a file name for the given inode. The reverse name lookup tool 122 may access the disk inodes and the directory entries (dentries) as described below. Operations of the reverse name lookup tool 122 are described below with respect to FIGS. 2-3B.

The DLP system 108 may communicate with DLP agents 120 on the client computing systems 102 to perform operations to enforce a DLP policy as described herein. The DLP agent 120 is configured to detect a violation of a DLP policy in the outbound data transfers. If the DLP agent 120 detects the violation, the DLP agent 120 may prevent the data transfer and may report the violation to the DLP system 108. For example, the DLP agent 120 may create an incident record of the violation, and may send the incident record to the DLP system 108, for example. The DLP system 108 is configured to receive the incident record of the violation from the DLP agent 120. In these embodiments, the DLP agent 120 creates the incident records. However, in other embodiments, any DLP product may be used to detect a violation and create an incident, and it is not limited to using DLP agents on an endpoint, as described herein. It should also be noted that other systems than DLP systems can use the reverse name lookup tool 122 as part of enforcing the DLP policies. Also, as described above, the reverse name lookup tool 122 can be used in other non-DLP systems in which the complete path name is needed for a given inode.

Although only one server computing system 106 is illustrated in FIG. 1, the DLP system 108 may be hosed on one or more machines, including one or more server computers, client computers, gateways or other computing devices. In yet another configuration, the DLP service may reside on a single server, or on different servers, coupled to other devices via a public network (e.g., the Internet) or a private network (e.g., LAN). In one embodiment, the DLP system 108 is part of an organization's system referred to herein as entity. In another embodiment, a service provider hosts the DLP system 108. The hosted service provider may also have multiple instances of the DLP system 108 on multiple networks that communicate with the service provider over a public or private network. It should be noted that various other network configurations can be used including, for example, hosted configurations, distributed configurations, centralized configurations, etc.

The depicted client computing system 102, which may operate as an endpoint machine in an enterprise network that uses the DLP system 108 to enforce one or more DLP policies, includes a DLP agent 120 that communicates with the DLP system 108. The client computing system 102 may include applications 140, external device interfaces 150, and network interfaces 160 that can be monitored by the DLP agent 102 as would be appreciated by one of ordinary skill in the art having the benefit of this disclosure. Alternatively, the DLP agent 102 can monitor other aspects of the client computing system 102 to monitor outbound data transfers. The client computing system 102 may also include a local data store 130, which can be one or more centralized data repositories that store the violation information, DLP policy information, and the like. The local data store 130 may represent a single or multiple data structures (databases, repositories, files, etc.) residing on one or more mass storage devices, such as magnetic or optical storage based disks, tapes or hard drives. Although illustrated as being local to the client computing system 102, the local data store 130 may be remote from the client computing system 102 and the client computing system 102 can communicate with the local data store 130 over a public or private network.

Figure 2:
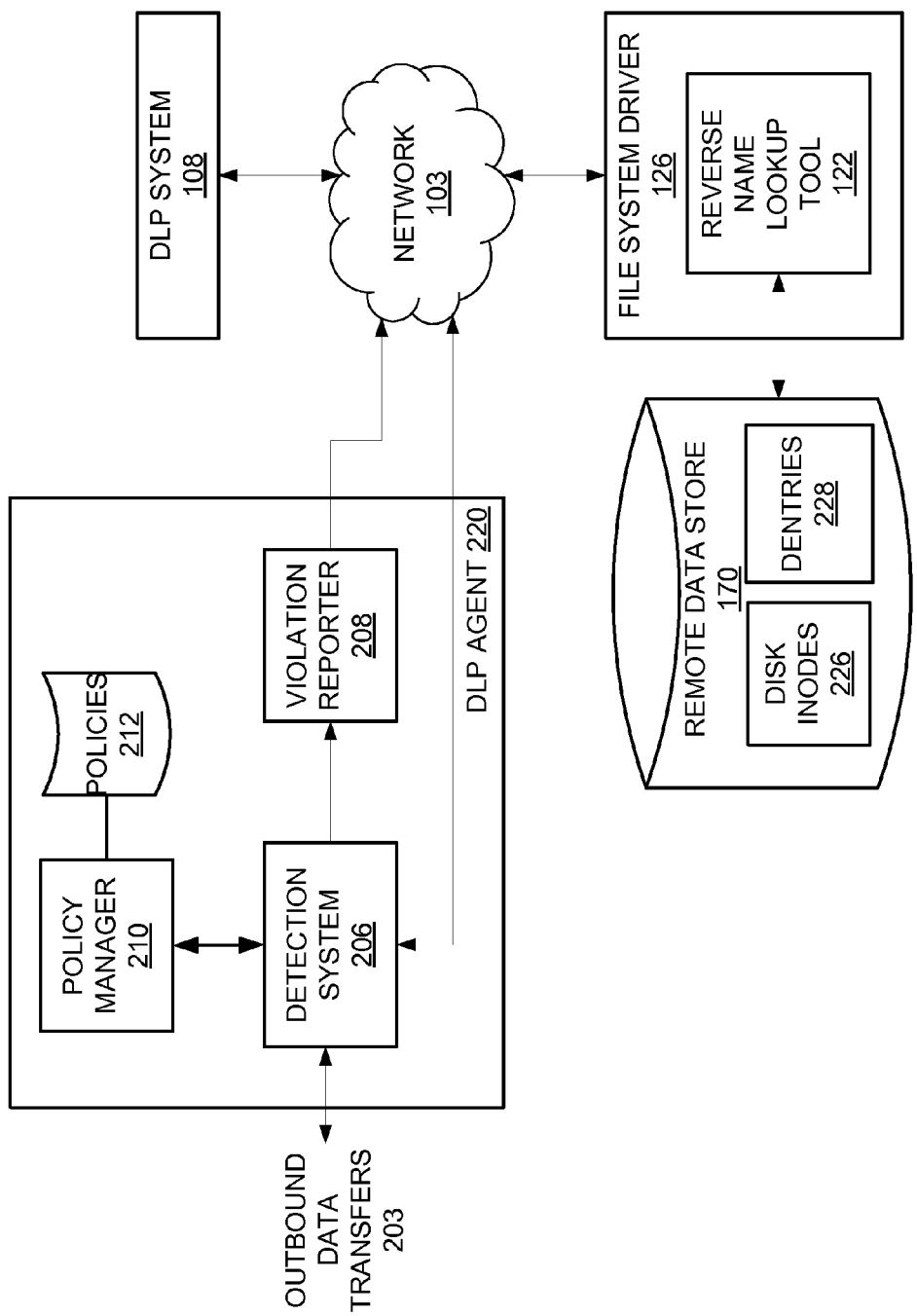
FIG. 2 is a block diagram of one embodiment of a DLP agent that sends a reverse name lookup request to a reverse name lookup tool.

FIG. 2 is a block diagram of one embodiment of a DLP agent 220 that sends a reverse name lookup request to a reverse name lookup tool 122. The DLP agent 120 also includes a violation reporter 208, a policy manager 210, and a policy data store 212. In the depicted embodiment, the detection system 206 is configured to monitor outbound data transfers 203. The outbound data transfers 203 may include data in transit, such as data associated with outgoing messages or other network traffic being sent by the client computing system 102 to a destination entity. The outbound data transfers 203 may also include data being printed, copied to a remote storage device, such as USB drive, a remote disk, or the like. The outbound data transfers 203 may be any data being transferred by the client computing system 102 via a wireless or wired connection to a destination entity, such as another device or to a remote device, such as, for example, a removable storage drive. The outbound data transfers 203 may be over the network 103 or over direct connections to the client computing system 102.

The detection system 206 is configured to determine whether the data transfer 203 violates a DLP policy. The detection system 206 is used to detect violations of the DLP policies and may perform some remedial or notification operation to help enforce the DLP policies. In one embodiment, the detection system 206 needs a complete path file name to detect a violation. In such cases, the detection system 206 sends a reverse name lookup request to the reverse name lookup tool 122 over the network 103. The reverse name lookup tool 122 performs the operations described below with respect to FIG. 3A or FIG. 3B and returns the complete path file name to the detection system 206 over the network 103.

In one embodiment, when the detection system 206 determines that outbound data transfer 203 violates one of the DLP policies 212, the violation reporter 208 creates an incident record of the violation, and sends the incident record to the DLP system 108 and/or stores the incident record in the local data store 130. The violation reporter 208 can send the incident records as they are generated or periodically. Similarly, the violation reporter 208 can send multiple incident records to the DLP system 108 in batches or sequentially. If a violation is detection, the violation reporter 208 may notify a system administrator (e.g., send an email or update a log file) about the policy violation incident, and may send information about the policy violation incident to the DLP service provider (e.g., DLP system 108). The information sent to the DLP service provider may identify, for example, the DLP policy being violated, the type of data being transferred, the destination entity specified to receive the data transfer, the DLP protection information of the destination entity, or other information concerning the violation, an identifier of the user or the client computing system 102 that caused the violation, as well as other information that may be helpful in remedying or recording the incidents.

The policy manager 302 defines DLP policies and stores them in the policy data store 212. The policy may require monitoring for data transfers. The policy manager 302 may create DLP policies based on user input, such as from the user of the client computing system 102 or an administrator of an organization providing the client computing system 102. Alternatively, the policy manager 302 may receive DLP policies from a DLP service provider (e.g., DLP system 108) and store them in the policy data store 212.

The DLP system 108 is configured to receive the incident record of the violation from the violation reporter 208, and may be configured to perform some remedial or reporting operation as would be appreciated by one of ordinary skill in the art having the benefit of this disclosure.

It should be noted that the DLP system 120 may include other components for monitoring outbound data transfers 203 for the data transfers to detect violations of the DLP policy, as well as other types of policies. Details regarding these other components have not been included so as to not obscure the description of the present embodiments.

In another embodiment, the DLP system 108 sends a reverse name lookup request to the reverse name lookup tool 122. The reverse name lookup tool 122 performs the operations described below with respect to FIG. 3A or FIG. 3B and returns the complete path file name to the DLP system 108.

Figure 3A:
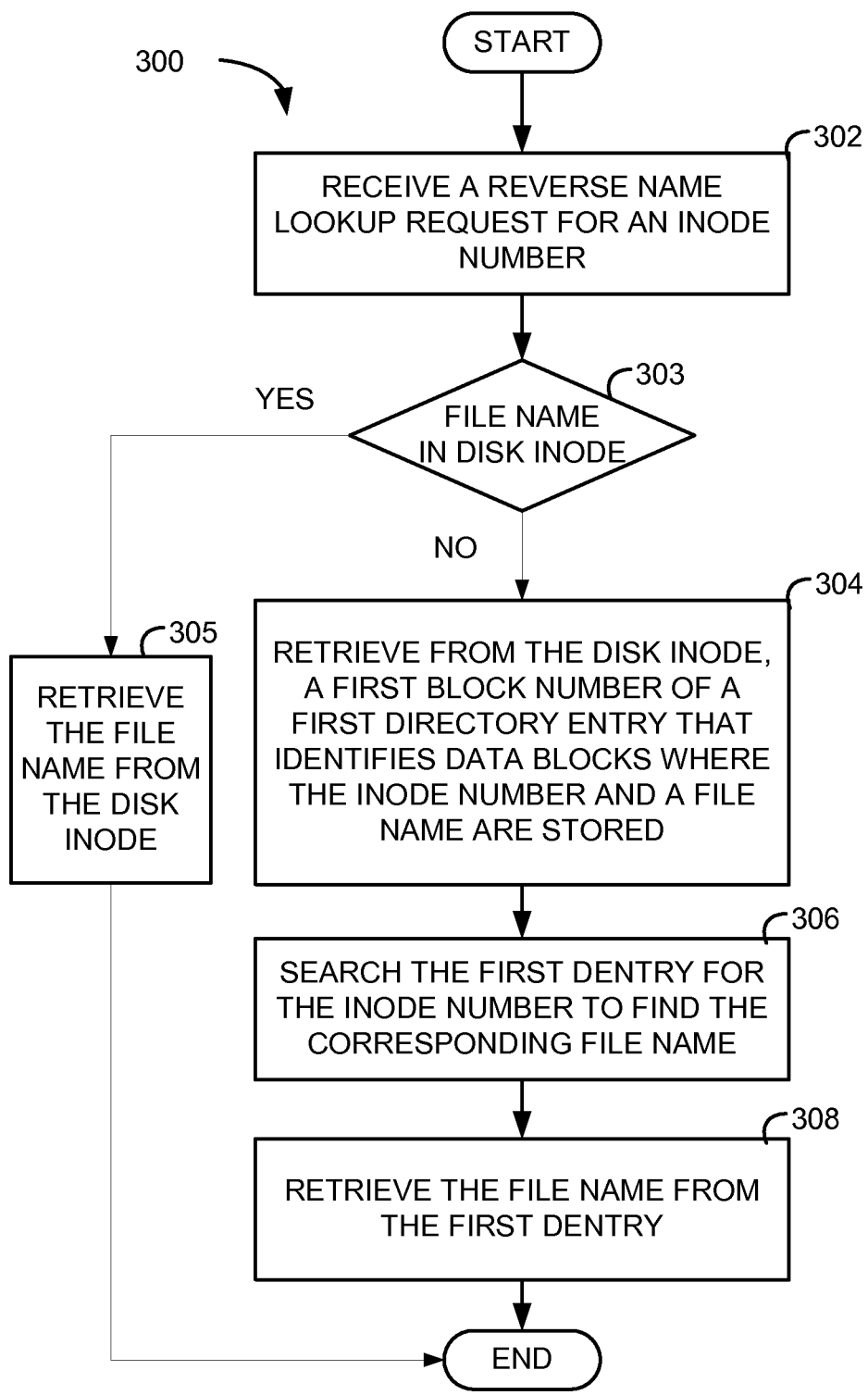
FIG. 3A is a flow diagram of one embodiment of a method of performing a reverse name lookup for a given inode number.

FIG. 3A is a flow diagram of one embodiment of a method 300 of performing a reverse name lookup for a given inode number. The method 300 is performed by processing logic that may comprise hardware (circuitry, dedicated logic, etc.), software (such as is run on a general purpose computing system or a dedicated machine), or a combination of both. In one embodiment, the server computing system 106 of FIG. 1 performs the method 300. In another embodiment, the file system driver 126 of FIGS. 1 and 2 performs the method 300.

In another embodiment, the reverse name lookup tool 122 of FIGS. 1 and 2 performs the method 300. Alternatively, other components of the server computing system 106 can be configured to perform some or all of the method 300.

Referring to FIG. 3A, processing logic begins method 300 by receiving a reverse name lookup request for an inode number (block 302). The processing logic checks to see if the filename is stored in a disk inode corresponding to the inode number (block 303). As described herein, if the file name is too large to be stored in the disk inode, the disk inode stores a block number of a first directory entry (dentry) that stores the file name. If the processing logic determines that the file name is in the disk inode at block 303, the processing logic retrieves the file name from the disk inode and returns the file name to the requesting client (block 305), and the method 300 ends. However, if the processing logic determines that the file name is not in the disk inode at block 303, the processing logic retrieves from the disk inode a first block number of a first directory entry (dentry), the first dentry identifying directory data blocks where the inode number and a file name are stored (block 304). The processing logic searches the first dentry for the inode number to find the corresponding file name (block 306), and retrieves the file name from the first dentry (block 308), and the method 300 ends.

In a further embodiment, the processing logic determines whether the first dentry identifies a second dentry of a first parent directory. When the first dentry identifies the second dentry, processing logic retrieves, from the second dentry, a first parent inode number of the first parent directory to make a link list, and a second block number of parent directory data blocks where a first name of a first hard link of the first parent directory is stored. The processing logic searches the second dentry for the second block number to find the first name of the first hard link, and retrieves the first name from the second dentry and pre-appends the first name of the first hard link to a path of the file name.

In a further embodiment, the processing logic determines whether the second dentry identifies a third dentry of a third parent directory. When the second dentry identifies the third dentry, processing logic retrieves, from the third dentry, a second parent inode number of the second parent directory to add to the link list, and a third block number of parent directory data blocks where a second name of a second hard link of the second parent directory is stored. The processing logic searches the third dentry for the third block number to find the second name of the second hard link. The processing logic retrieves the second name from the third dentry and pre-appends the second name of the second hard link to the path of the file name.

In one embodiment, the disk inode includes a first structure. The first structure includes the inode number, the block number of the first dentry, and a hard link count. For example, the disk inode structure could be represented as follows: inode {parent_ino, blknr, linkcnt}. The disk inode structure may include other fields as well. Dentries may include a second structure that includes the inode number, the file name, a file length, and a dentry length. For example, the dentry structure could be represented as follows: {ino, file name, file_len, dentry_len}. The dentry structure may include other fields and may have a variable length. In one embodiment, if the link count (linkcnt) in disk inode is more than 1, then first 8 bytes of file name will be used to store A and B fields mentioned above in dentry structure and dentry_len will be adjusted accordingly. D1 directory is in root and file F1 is in D1 directory. File "/F2" is hard link of "/D1/F1" file. mode number of root directory, D1 directory and F1 file is 1, 2 and 4 respectively. Hence, reverse name lookup of inode number 4 should give two paths, "/D1/F1" and "/F2". It will start with iget (4), and disk inode of 4 will look like something {2, 511, 2}, where 511 is the block number of the dentry in D1 directory and 2 is hard link count. So, the dentry of file F1 or inode number 4 will look like, {4, {1,224, 'F', '1'}, 2, 14}. And dentry of file F2 will be like {4, {0,0, 'F', '2'}, 2, 14}, where zero denotes it is the last hard link in the list. During the re-organization of a directory after deletion of files, the disk inode may need to be updated if and only if the block number gets changed. Conventionally, calculating complete path from an inode number (ino) results in many disk accesses. One method could be to start from root and do recursive searching of the inode number in the directory entries (dentry) of all the directories and sub-directories and keep appending the directory (dir) name in the resultant path and remove its name if not found. This results in reverse lookup using forward lookup which leads to a large number of disk accesses. Conventional file system drivers store the parent directory's inode number on this disk inode to reduce disk access of searching parent directory hence not required of doing forward lookup. But again a lot of disk access will be required while searching dentry with an inode number in all the data blocks of the directory using conventional solutions. Using the embodiments described herein, searching of inode number in dentries in all the data blocks of the directory is completely removed, hence reducing the disk access by changing the disk inode structure and directory entry structure.

Figure 3B:
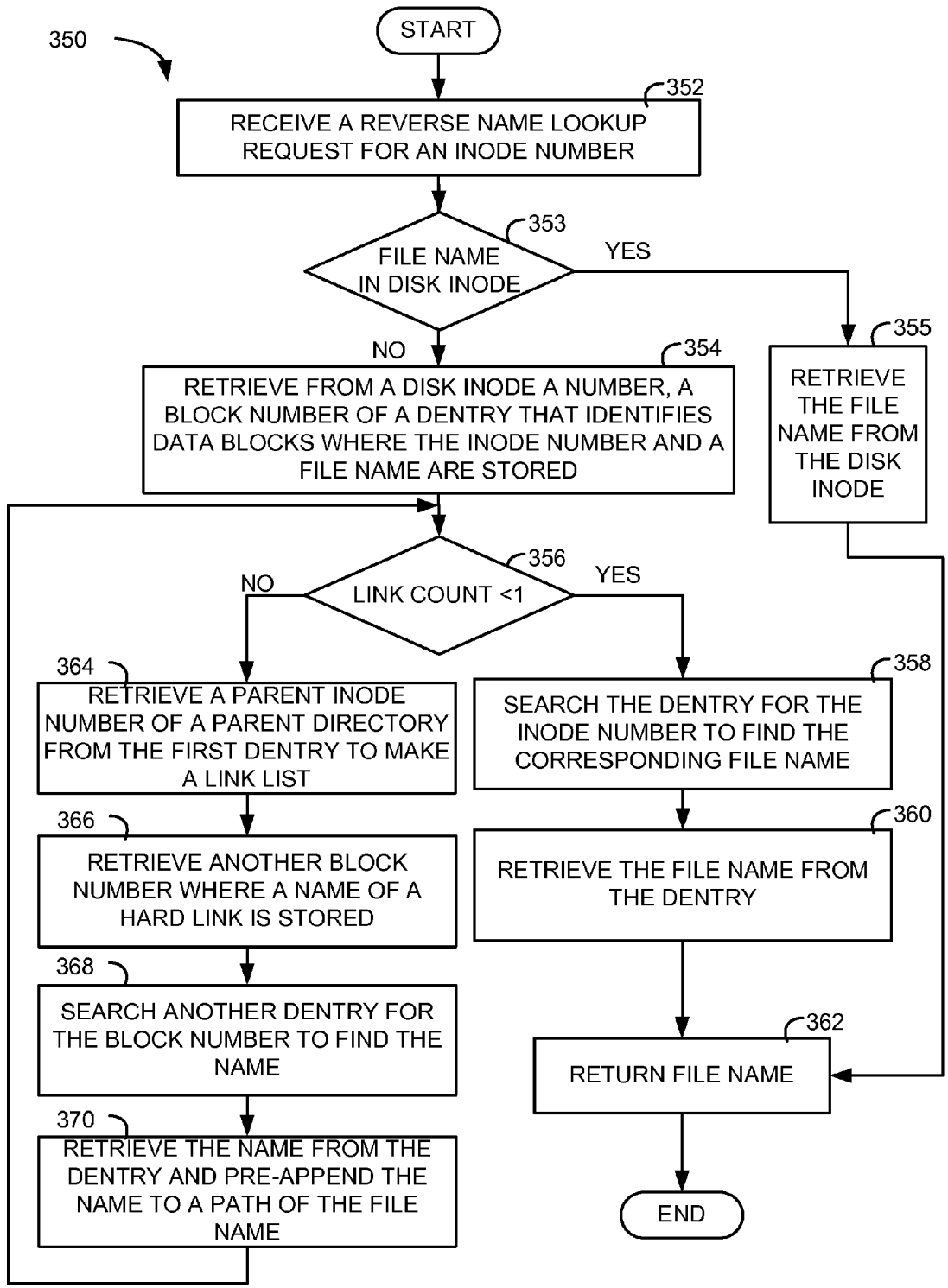
FIG. 3B is a flow diagram of another embodiment of a method of performing a reverse name lookup for a given inode number.

FIG. 3B is a flow diagram of another embodiment of a method 350 of performing a reverse name lookup for a given inode number. The method 350 is performed by processing logic that may comprise hardware (circuitry, dedicated logic, etc.), software (such as is run on a general purpose computing system or a dedicated machine), or a combination of both. In one embodiment, the server computing system 106 of FIG. 1 performs the method 350. In another embodiment, the file system driver 126 of FIGS. 1 and 2 performs the method 350.

In another embodiment, the reverse name lookup tool 122 of FIGS. 1 and 2 performs the method 350. Alternatively, other components of the server computing system 106 can be configured to perform some or all of the method 350.

Referring to FIG. 3B, processing logic begins method 350 by receiving a reverse name lookup request for an inode number (block 352). The processing logic checks to see if the filename is stored in a disk inode corresponding to the inode number (block 353). As described herein, if the file name is too large to be stored in the disk inode, the disk inode stores a block number of a first directory entry (dentry) that stores the file name. If the processing logic determines that the file name is in the disk inode at block 353, the processing logic retrieves the file name from the disk inode (block 355) and returns the file name to the requesting client (block 362), and the method 350 ends. However, if the processing logic determines that the file name is not in the disk inode at block 353, the processing logic retrieves from the disk inode a block number of a directory entry (dentry), the dentry identifying directory data blocks where the inode number and a file name are stored (block 354). The processing logic determines whether the link count in the disk node is more than one (block 356). When the link count less than one, processing logic searches the dentry for the inode number to find the corresponding file name (block 358), and retrieves the file name from the dentry (block 360). The processing logic returns the file name (block 362), and the method 350 ends. However, if at block 356 the link count is equal to or more than one, the processing logic retrieves a parent inode number of a parent directory from the dentry to make a link list (block 364), and retrieves another block number of the parent directory where a name of a hard link of the parent directory is stored (block 366). The processing logic searches another dentry of the parent directory for the block number to find the name (block 368), and retrieves the first name of the hard link from the other dentry and pre-appends the name of the hard link to a path of the file name. The processing logic may return to block 356 to determine whether a second link count of the parent directory is more than one. When the second link count is equal to or more than one, processing logic repeats the operations at blocks 364-370; otherwise, the processing logic returns the file name at block 362.

In one embodiment, when the link count in the disk mode is more than one then a first eight bytes of the file name stores a next parent inode number of a next parent directory and a next block number of the next parent directory. In another embodiment, the dentry length may be adjusted accordingly when the link count in the disk mode is more than one.

In another embodiment, the parent directory is a partitioned directory, and the parent inode number is stored in the disk inode.

Figure 4:
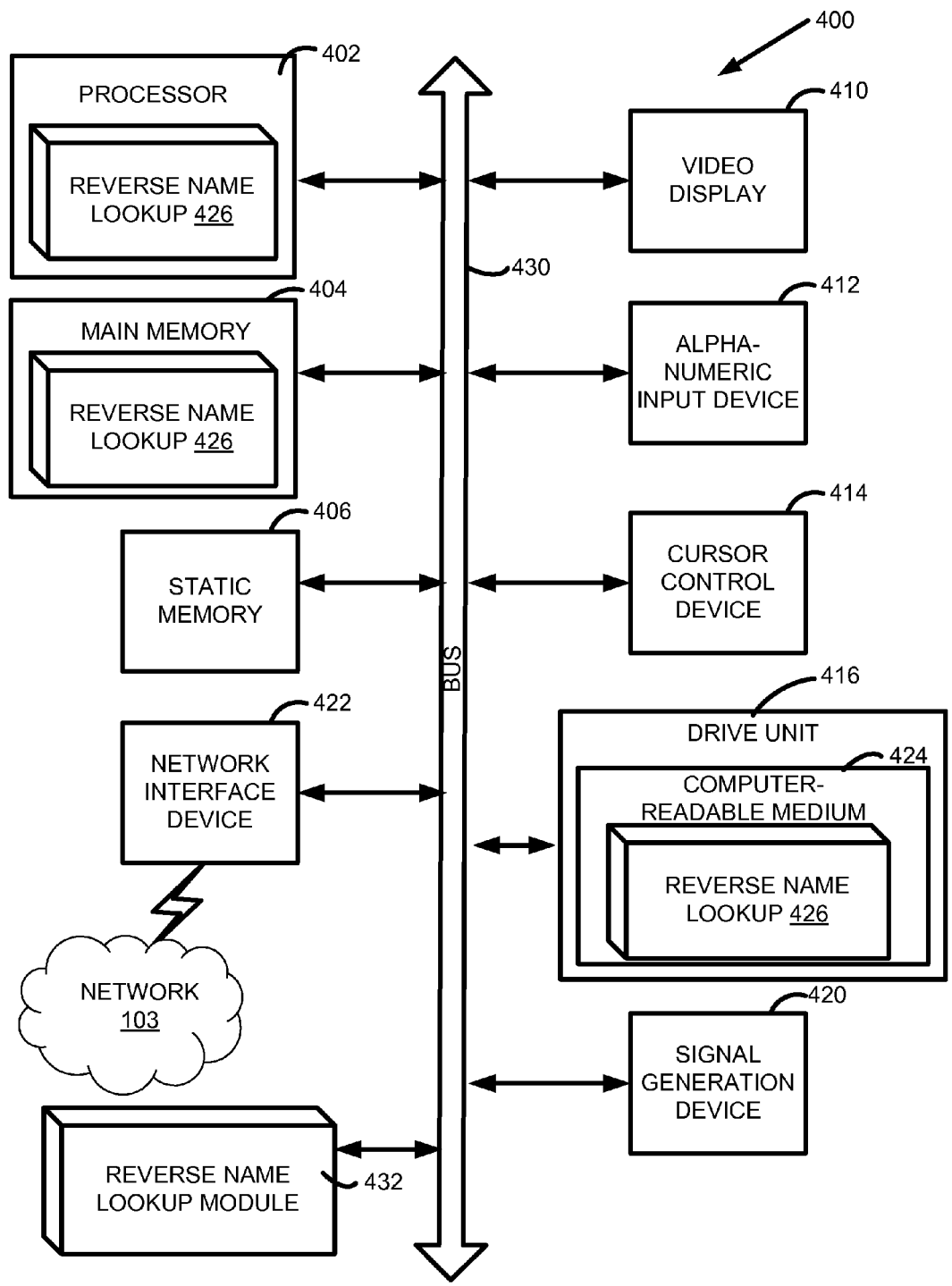
FIG. 4 illustrates a diagrammatic representation of a machine in the exemplary form of a computing system within which a set of instructions, for causing the machine to perform any one or more of the methodologies described herein, may be executed.

FIG. 4 illustrates a diagrammatic representation of a machine in the exemplary form of a computing system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as method 300 of FIG. 3A or the method 350 of FIG. 3B.

The exemplary computing system 400 includes a processor 402, a main memory 404 (e.g., read-only memory (ROM), flash memory, dynamic random access memory (DRAM) such as synchronous DRAM (SDRAM), etc.), a static memory 406 (e.g., flash memory, static random access memory (SRAM), etc.), and a data storage device 418, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute the processing logic for reverse name lookup 426 for performing the operations and steps discussed herein.

The computing system 400 may further include a network interface device 422. The computing system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions (e.g., reverse name lookup 426) embodying any one or more of the methodologies or functions described herein. The reverse name lookup 426 may also reside, completely or at least partially, within the main memory 404 and/or within the processor 402 during execution thereof by the computing system 400, the main memory 404, and the processor 402 also constituting computer-readable media.

The reverse name lookup 426 may further be transmitted or received over a network 420 via the network interface device 422.

While the computer-readable storage medium 424 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The reverse name lookup module 432, components, and other features described herein (for example in relation to FIGS. 1-2) can be implemented as discrete hardware components or integrated in the functionality of hardware components such as ASICS, FPGAs, DSPs, or similar devices. The reverse name lookup module 432 may implement operations of reverse name lookup as described herein with respect to FIGS. 3A and 3B. In addition, the reverse name lookup module 432 can be implemented as firmware or functional circuitry within hardware devices. Further, the reverse name lookup module 432 can be implemented in any combination hardware devices and software components.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "monitoring", "creating", "generating", "sending", "intercepting," "capturing," "mapping", "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a computing system programmed to perform the following, comprising:
    receiving, at a file system driver executing on the computing system, a reverse name lookup request for an inode number of a file system;
    determining whether a disk inode associated with the inode number stores a file name of a file associated with the disk inode;
    when the disk inode stores the file name, retrieving, from the disk inode, the file name of the file; and
    when the disk inode does not store the file name:
        retrieving, from the disk inode, a first block number of a first directory entry (dentry), the first block number identifying directory data blocks of the first dentry where the inode number and the file name are stored;
        searching, by the file system driver, the first block number of the first dentry to find the corresponding file name; and
        retrieving, by the file system driver, the file name from the first dentry;
    wherein the disk inode comprises a first structure comprising the inode number, the block number of the first dentry, and a count of hard links that comprise directory entries that associate a name with a file on the file system; and
    wherein when the count of hard links in the disk inode is more than one, a first eight bytes of the file name stores a next parent inode number of a next parent directory and a next block number of the next parent directory.

2. The method of claim 1, further comprising:
    determining whether the first dentry identifies a second dentry of a first parent directory;
    when the first dentry identifies the second dentry, retrieving from the second dentry, a first parent inode number of the first parent directory to make a link list, and a second block number identifying parent directory data blocks of the second dentry where a first name of a first hard link of the first parent directory is stored;
    searching, by the file system driver, the second block number of the second dentry to find the first name of the first hard link;
    retrieving, by the file system driver, the first name from the second dentry; and
    pre-appending the first name of the first hard link to a path of the file name.

3. The method of claim 2, further comprising:
    determining whether the second dentry identifies a third dentry of a third parent directory;
    when the second dentry identifies the third dentry, retrieving from the third dentry, a second parent inode number of the second parent directory to add to the link list, and a third block number identifying parent directory data blocks of the third dentry where a second name of a second hard link of the second parent directory is stored;
    searching, by the file system driver, the third block number of the third dentry to find the second name of the second hard link;
    retrieving, by the file system driver, the second name from the third dentry; and
    pre-appending the second name of the second hard link to the path of the file name.

4. The method of claim 2, wherein the first parent directory is a partitioned directory, and wherein the parent inode number is stored in the disk inode.

5. The method of claim 1, wherein the first dentry comprises a second structure comprising the inode number, the file name, a file length, and a dentry length.

6. The method of claim 5, wherein the second structure is variable.

7. The method of claim 1, further comprising:
    determining whether the count of the hard links in the disk node is more than one;
    when the link count is equal to or more than one:
        retrieving a parent inode number of a first parent directory from the first dentry to make a link list; and
        retrieving from the first dentry a second block number that identifies where a first name of a first hard link is stored in the first parent directory; and
    when the link count is less than one, returning the file name in response to the request.

8. The method of claim 7, further comprising:
    searching, by the file system driver, a second dentry of the first parent directory for the second block number to find the first name of the first hard link;
    retrieving, by the file system driver, the first name of the first hard link from the second dentry; and
    pre-appending the first name of the first hard link to a path of the file name.

9. The method of claim 8, further comprising:
    determining whether a second link count of the first parent directory is more than one;
    when the second link count is equal to or more than one:
        retrieving a second parent inode number of a second parent directory from the second dentry to add to the link list; and
        retrieving from the second dentry a third block number that identifies where a second name of a second hard link is stored in the second parent directory; and
    when the second link count is less than one, returning the path of the file name in response to the request.

10. The method of claim 9, further comprising:
- searching, by the file system driver, a third dentry of the second parent directory for the third block number to find the second name of the second hard link;
- retrieving, by the file system driver, the second name of the second hard link from the third dentry; and
- pre-appending the second name of the second hard link to the path of the file name.

11. The method of claim 5, further comprising adjusting the dentry length accordingly when the link count in the disk inode is more than one.

12. A computing system, comprising:
- a memory; and
- a processor communicably coupled with the memory to:
  - receive, at a file system driver executing on the computing system, a reverse name lookup request for an inode number of a file system;
  - determine whether a disk inode associated with the inode number stores a file name of a file associated with the disk inode;
  - when the disk inode stores the file name, retrieve, from the disk inode, the file name of the file; and
  - when the disk inode does not store the file name:
    - retrieve from the disk inode a first block number of a first directory entry (dentry) when the disk inode does not store the file name, the first block number identifying directory data blocks where the inode number and a file name are stored;
    - search, by the file system driver, the first block number of the first to find the corresponding file name; and
    - retrieve, by the file system driver, the file name from the first dentry,
  - wherein the disk inode comprises a first structure comprising the inode number, the block number of the first dentry, and a count of hard links that comprise directory entries that associate a name with a file on the file system; and
  - wherein when the count of hard links in the disk inode is more than one, a first eight bytes of the file name stores a next parent inode number of a next parent directory and a next block number of the next parent directory.

13. The computing system of claim 12, wherein the processor is further to:
- determine whether the first dentry identifies a second dentry of a first parent directory;
- when the first dentry identifies the second dentry, retrieve from the second dentry, a first parent inode number of the first parent directory to make a link list, and a second block number identifying parent directory data blocks of the second dentry where a first name of a first hard link of the first parent directory is stored;
- search, by the file system driver, the second block number of the second dentry to find the first name of the first hard link;
- retrieve, by the file system driver, the first name from the second dentry; and
- pre-append the first name of the first hard link to a path of the file name.

14. The computing system of claim 13, wherein the processor is further to:
- determine whether the second dentry identifies a third dentry of a third parent directory;
- when the second dentry identifies the third dentry, retrieve from the third dentry, a second parent inode number of the second parent directory to add to the link list, and a third block number identifying parent directory data blocks of the third dentry where a second name of a second hard link of the second parent directory is stored;
- search, by the file system driver, the third block number of the third dentry to find the second name of the second hard link;
- retrieve, by the file system driver, the second name from the third dentry; and
- pre-append the second name of the second hard link to the path of the file name.

15. The computing system of claim 12, wherein the first dentry comprises a second structure comprising the inode number, the file name, a file length, and a dentry length.

16. A non-transitory computer readable storage medium including instructions that, when executed by a processor, cause the processor to perform operations comprising:
- receiving, at a file system driver executing by the processor, a reverse name lookup request for an inode number of a file system;
- determining whether a disk inode associated with the inode number stores a file name of a file associated with the disk inode;
- when the disk inode stores the file name, retrieving, from the disk inode, the file name of the file; and
- when the disk inode does not store the file name:
  - retrieving, from the disk inode, a first block number of a first directory entry (dentry), the first block number identifying directory data blocks of the first dentry where the inode number and the file name are stored;
  - searching, by the file system driver, the first block number of the first dentry to find the corresponding file name; and
  - retrieving, by the file system driver, the file name from the first dentry;
- wherein the disk inode comprises a first structure comprising the inode number, the block number of the first dentry, and a count of hard links that comprise directory entries that associate a name with a file on the file system; and
- wherein when the count of hard links in the disk inode is more than one, a first eight bytes of the file name stores a next parent inode number of a next parent directory and a next block number of the next parent directory.

17. The non-transitory computer readable storage medium of claim 16, wherein the operations further comprises:
- determining whether the first dentry identifies a second dentry of a first parent directory;
- when the first dentry identifies the second dentry, retrieving from the second dentry, a first parent inode number of the first parent directory to make a link list, and a second block number identifying parent directory data blocks of the second dentry where a first name of a first hard link of the first parent directory is stored;
- searching, by the file system driver, the second block number of the second dentry to find the first name of the first hard link;
- retrieving, by the file system driver, the first name from the second dentry; and
- pre-appending the first name of the first hard link to a path of the file name.

18. The non-transitory computer readable storage medium of claim 17, wherein the operations further comprise:
- determining whether the second dentry identifies a third dentry of a third parent directory;
- when the second dentry identifies the third dentry, retrieving from the third dentry, a second parent inode number of the second parent directory to add to the link list, and a third block number identifying parent directory data blocks of the third dentry where a second name of a second hard link of the second parent directory is stored;

searching, by the file system driver, the third block number of the third dentry to find the second name of the second hard link;

retrieving, by the file system driver, the second name from the third dentry; and pre-appending the second name of the second hard link to the path of the file name.

19. The non-transitory computer readable storage medium of claim 16, wherein the first dentry comprises a second structure comprising the inode number, the file name, a file length, and a dentry length.

20. The non-transitory computer readable storage medium of claim 19, wherein the second structure is variable.

\* \* \* \* \*